United States Patent [19]

Tack, Jr. et al.

[11] 4,408,281

[45] Oct. 4, 1983

[54] CONTROL SYSTEM FOR SYNCHRONIZING MULTIPLE PRESSES IN A LINE

[75] Inventors: Carl E. Tack, Jr., Glen Ellyn; Francis E. Heiberger, Elmhurst, both of Ill.

[73] Assignee: Danly Machine Corporation, Chicago, Ill.

[21] Appl. No.: 287,536

[22] Filed: Jul. 27, 1981

[51] Int. Cl.³ ................. H02P 5/50; C03B 9/40
[52] U.S. Cl. ................. 364/476; 364/143; 318/85
[58] Field of Search .......... 364/476, 143, 140, 138, 364/469; 318/85, 604

[56] References Cited

U.S. PATENT DOCUMENTS

| Re. 29,642 | 5/1978 | Kwiathowski et al. | 364/143 X |
|---|---|---|---|
| 3,621,348 | 11/1971 | Uchida et al. | 318/85 X |
| 3,675,098 | 7/1972 | Heiberger | 318/85 |
| 3,845,286 | 10/1974 | Aronstein et al. | 364/140 |
| 3,984,699 | 10/1976 | Bailey | 364/140 X |
| 4,014,352 | 3/1977 | Jamieson | 364/143 X |
| 4,052,601 | 10/1977 | Corni | 364/138 |
| 4,247,317 | 1/1981 | Wood et al. | 364/476 X |
| 4,253,050 | 2/1981 | Angst | 318/85 X |
| 4,314,185 | 2/1982 | Schneider et al. | 318/85 |
| 4,378,592 | 3/1983 | Heiberger et al. | 364/476 |

*Primary Examiner*—Edward J. Wise
*Attorney, Agent, or Firm*—Leydig, Voit, Osann, Mayer & Holt, Ltd.

[57] ABSTRACT

A control system for a press line containing a plurality of presses for performing successive operations on the same workpiece has a plurality of computer control units, each of which controls the movement of one of the presses and the workpiece transfer mechanisms associated therewith via repetitive automation cycles which correspond to and control repetitive press cycles. One of the computer control units selected as a reference unit, and all the computer control units, including the reference unit, produce a synchronizing signal at a common predetermined point in the automation cycles thereof. The synchronizing signal from the reference unit is compared with the synchronizing signal from each of the other units to determine whether the other units are lagging or leading the reference unit. The cycle times of the leading and lagging units are then adjusted accordingly.

19 Claims, 4 Drawing Figures

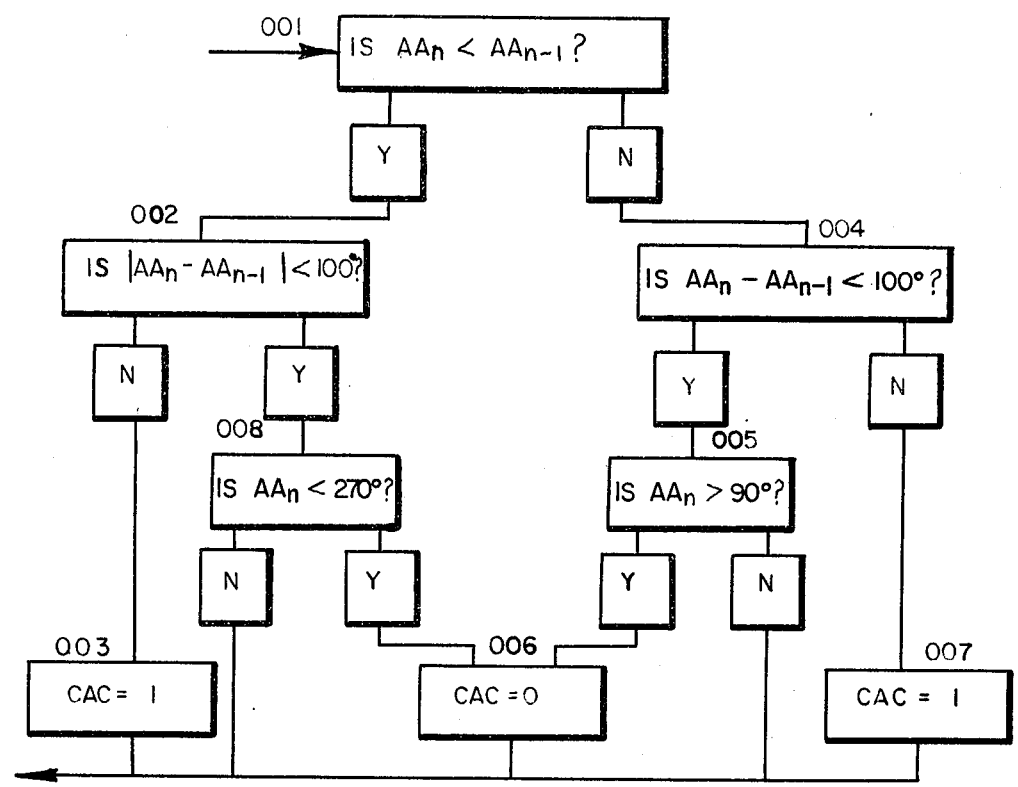
FIG. 3
FIG. 4
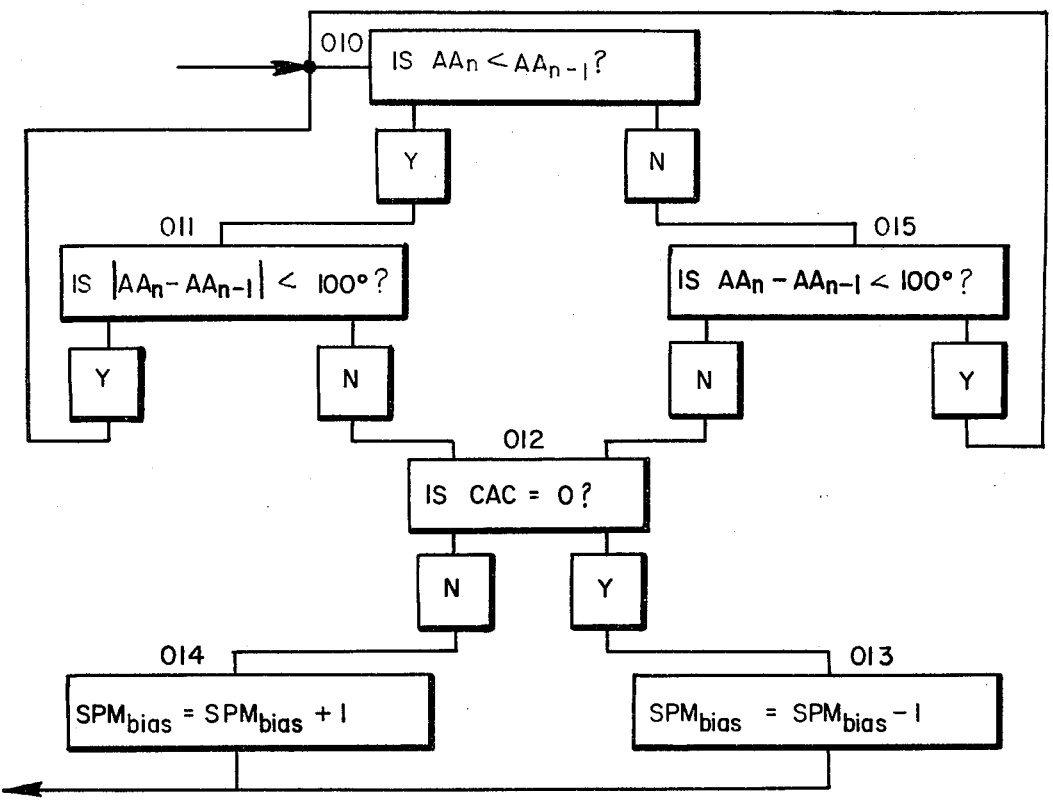

CONTROL SYSTEM FOR SYNCHRONIZING MULTIPLE PRESSES IN A LINE

DESCRIPTION OF THE INVENTION

The present invention relates generally to power presses and, more particularly, to a control system for a multiple-press line for performing successive operations on the same workpieces.

It is a primary object of the present invention to provide an improved and economical control system which ensures precisely synchronized operation of the multiple presses in a line, as well as the respective loaders, unloaders and conveyors associated with the various presses.

It is another important object of the present invention to provide such an improved control system which permits a press line to be set up to run at the minimum cycle time, thereby maximizing productivity, without the need for any inter-press sequencing within a press cycle.

A further object of this invention is to provide such an improved control system which can be readily retrofit onto existing press lines.

Still another important object of the present invention is to provide such an improved control system which synchronizes the multiple presses in a line independently of the sequential movements of the various presses (and their respective loaders and unloaders) within a given cycle. In this connection, a related object of the invention is to provide such a control system which maintains precise synchronization of all the presses in a line even in the face of variations in the cycle time of one or more of the presses.

Other objects and advantages of the invention will be apparent from the following detailed description and the accompanying drawings.

In accordance with the present invention, there is provided a control system for a press line containing a plurality of presses for performing successive operations on the same workpiece, the control system comprising a plurality of computer control units each of which controls the movements of one of the presses and the workpiece transfer mechanisms associated therewith via repetitive automation cycles which correspond to and control repetitive press cycles; means for producing a synchronizing signal at a common predetermined point in the automation cycles of all the computer control units; means for supplying the synchronizing signal from one of the computer control units selected as a reference unit to each of the other computer control units; and each of the other computer control units having means responsive to the synchronizing signal from that unit and the synchronizing signal from the reference unit for increasing or decreasing the automation cycle of that unit according to whether its synchronizing signal is leading or lagging the synchronizing signal from the reference unit.

In the drawings:

FIG. 3 is a flow chart illustrating part of the operation of one of the computer control units which is selected as a reference unit in the system of FIG. 1; and FIG. 4 is a flow chart illustrating part of the operation of the other computer control units in the system of FIG. 1.

While the invention will be described in connection with a preferred embodiment, it will be understood that it is not intended to limit the invention to the particular embodiment shown but, to the contrary, it is intended to cover the various alternatives, modifications and equivalents included within the spirit and scope of the appended claims.

Figure 1:
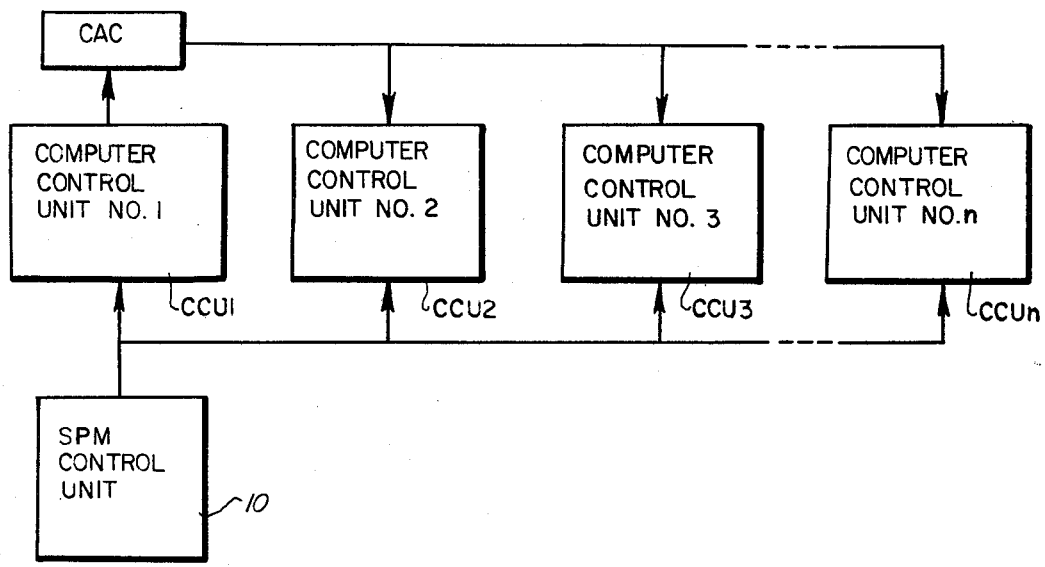
FIG. 1 is a block diagram of a control system embodying the present invention, for controlling multiple presses in a press line.

Turning now to the drawings and referring first to FIG. 1, a multiplicity of computer control units CCU1, CCU2, CCU3 . . . CCUn are provided for controlling a similar number of presses in a press line. Each of these computer control units receives an input signal from a common "SPM" (strokes per minute) control unit 10 which sets the desired time period for each press cycle, thereby setting the number of strokes per minute for each press. This SPM control unit 10 is set manually, and supplies signals to the various computer control units CCU1 through CCUn at repetitive time intervals which are typically accurate to within about 0.05%. This degree of accuracy is not sufficient to keep the presses properly synchronized at the minimum cycle times required for maximum productivity. These minimum cycle times are achieved by reducing the clearance between the press dies and the cooperating parts of the loading and unloading mechanisms to a minimum, and thus the magnitude of the errors that can be tolerated becomes extremely small. Even timing errors within the 0.05% tolerance range of the SPM unit 10 can be intolerable, but even worse, errors within the 0.05% tolerance range can be repeated and accumulate over a large number of press cycles, leading to errors of much more than 0.05%.

Each of the individual computer control units CCU1 through CCUn synchronizes the movements of the press slide and associated loading and unloading mechanisms for one of the presses in the line. The loading mechanism moves workpieces into the working area of the press between its upper and lower dies, and the unloading mechanism removes the workpieces from the working area. One example of a computer control unit for controlling these various functions is described in our copending U.S. patent application Ser. No. 182,754 filed Aug. 29, 1980 for "Computer Directed Loading and Unloading Device," now abandoned.

Figure 2:
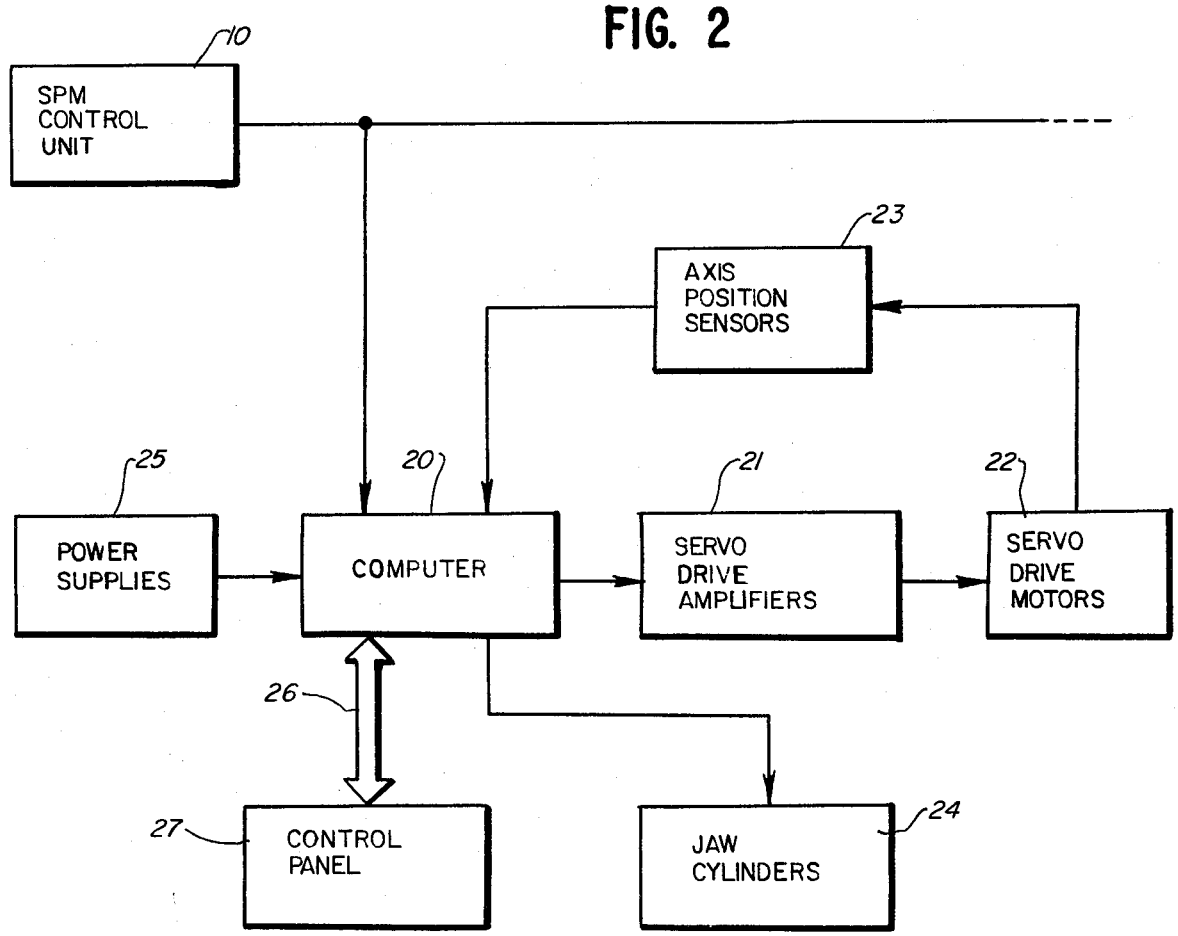
FIG. 2 is a more detailed block diagram of one of the computer control units included in the system of FIG. 1.

FIG. 2 illustrates a system similar to that described in the aforementioned copending application, except that the system of FIG. 2 controls the movement of the press slide as well as the loading and unloading mechanisms. Thus, a computer 20 in the system of FIG. 2 may control the cycling of the press slide, two axes of movement of the loader, two axes of movement of the unloader, and the movement of an output conveyor. The computer 20 produces control signals for each of a plurality of servo-drive amplifiers 21, e.g., one for the press slide, one for each axis of the loader and unloader, and one for the output conveyor. The servo-drive amplifiers 21 receive analog signals which are produced by the computer 20 through a digital-to-analog conversion, and each amplifier drives a separate servo motor 22 which supplies the motive power for one of the axes mentioned above.

To complete each of the servo loops which control the drive motors 22, an axis position sensor 23 senses the position of the output of each of the drive motors, and these sensors 23 continuously feed back position information to the computer 20. The computer compares the desired axis positions with the actual positions to continually update the input signals to the servo-drive amplifiers 21.

The computer 20 also controls the opening and closing of jaw cylinders 24 associated with the loader and unloader mechanisms. These jaw cylinders 24 are activatable by appropriate signals at the desired points in the press cycle. The computer 20 also receives conventional supply voltages from power supplies 25, and interacts on a bus 26 with a control panel 27 which includes means for entering desired axis positions into the computer, and displays for indicating positions of devices and of the press drive during operation.

In accordance with one of the important aspects of the present invention, the computer control unit for one of the presses in the line is selected as a reference unit; all the computer control units, including the reference unit, produce a synchronizing signal at a common predetermined point in their respective cycles; and the synchronizing signal from the reference unit is compared with the synchronizing signal from each of the other units to determine whether the other units are lagging or leading the reference unit. The cycle times of the leading and lagging units are then adjusted accordingly. This synchronization system can result in some "hunting" of control units that switch back and forth between leading and lagging phase relationships to the reference unit, but the increments of adjustment are so small that such hunting has no adverse effect. For example, a typical increment of adjustment is only 0.001% of the time period for one cycle.

This synchronization system permits a press line to be set up to run at the minimum cycle time, which maximizes productivity, without the need for any inter-press sequencing within a press cycle. Each press follows a predetermined sequence of motions, at predetermined velocities, under the control of its own computer control unit. Synchronization among the various presses is achieved by synchronizing the times cycles of the various control units, which can be achieved simply and quickly with a high degree of precision.

A preferred system or program for synchronizing the various computer control units CCU1 through CCUn will now be described in more detail in conjunction with exemplary flow charts, assuming the first computer control unit CCU1 is selected as the reference unit. Each of the computer control units includes a clock and a counter register (not shown) which is incremented at a rate which produces 10,000 counts in the time set for one automation cycle. This has the effect of subdividing the time period for each automation cycle into 10,000 increments. It will be appreciated that the number 10,000 is merely one example, and that the automation cycle could be similarly subdivided into any arbitrarily selected number, provided the number is sufficiently large that the incremental time period represented by a single count does not represent a significant error, preferably less than 0.1%, in the synchronization of the cycle times for the various presses.

The clock controls the interval at which the counter register is incremented. At the end of each 10,000 count, during which the automation will have advanced through a complete cycle under the control of the computer 20, the counter is reset to zero. The rate at which the counts accumulate in the reference unit CCU1 is controlled by the signal from the SPM control unit 10 via the computer 20 in the unit CCU1. The rates at which the counts accumulate in the other control units CCU2 through CCUn are also controlled by the signal from the SPM control unit 10, but as modified by the synchronization system to be described below. Because the content of each counter is dependent upon the number of incremental counts received, rather than the actual press position within a given cycle, the content of the counter is referred to herein as the "automation angle", and the time period between successive resets of the counter is referred to as the "automation cycle". It will be understood that the computer control unit for each individual press has its own independent, internally developed automation cycle, as determined by that unit's internal counter register incrementation. As the counter of each computer control unit is incremented (or decremented in the event that the press is moving in the reverse direction), the counter content represents successive automation angles which change in units of 1/10,000 of the total time period set for one complete automation cycle. That is, during each automation cycle, the counter increments from automation angle $AA_1$ to automation angle $AA_{10,000}$, with an instantaneous automation angle $AA_n$ at any given instant. An automation cycle will be referred to as having a total of 360°, as in the physical cycle of a press, but it should be understood that the physical position of the press at any given time usually will not correspond to the automation angle because the press moves at different velocities (and may even dwell at times) as it moves through its 360° cycle.

Turning now to FIG. 3, which illustrates the program followed by the "reference" computer control unit CCU1, the automation angle $AA_n$ represented by the number in the counter register is read at successive time periods marked off in actual time by conventional interrupt pulses produced at regular intervals, e.g., every 1.5 milliseconds. Step 001 determines whether each read automation angle $AA_n$ is less than the immediately preceding automation angle $AA_{n1}$. If the answer is "yes", the press has either been advanced past the end of a cycle, moving in the forward direction (e.g., $AA_1$ $AA_{10,000}$) or it is being moved backwards (e.g., $AA_{499}$ $AA_{500}$). In response to an affirmative answer at step 001, the system proceeds to step 002 which determines whether the absolute value of the difference between $AA_n$ and $AA_{n1}$ corresponds to an automation angle of less than 100°. The absolute value of this difference will normally be very small, e.g., 40/10,000 of 360°, regardless of the direction of press movement. At the end of a cycle, however, with the press being moved in the forward direction, the absolute value of the difference becomes very large, e.g., $AA_1 - AA_{10,000}$ 9960, which corresponds to an automation angle well above 100°. Thus a "no" answer at step 002 signifies that the system has completed an automation cycle in the forward direction.

In response to such a negative answer at step 002, the system proceeds to step 003 which sets a bit CAC to the "1" level, indicating the completion of an automation cycle. This bit CAC, which remains set for the first 90° of the next automation cycle, and is then reset to "0", is used to determine whether the various computer control units CCU2 through CCUn are synchronized with the reference unit CCU1, as will be apparent from the ensuing description.

Still referring to FIG. 3, the bit CAC is reset to "0" in response to a combination of a negative answer at step 001 and positive answers at steps 004 and 005. A negative answer at step 001 signifies either that the system is proceeding through an automation cycle in the forward direction, or that the system has reached the end of an automation cycle in the reverse direction. To determine which of these two conditions exists, step 004 determines whether the difference between $AA_n$ and $AA_{n1}$ is less than 100°. If the answer is "yes", it means that the system is proceeding through an automation cycle in the forward direction because the difference between $AA_n$ and $AA_{n1}$ is always very large at the end of an automation cycle. (It will be appreciated that the 100° used as a reference angle in step 004 is an arbitrary selection, and virtually any automation angle other than 360° could be used for this purpose.) The system then proceeds to step 005 which determines whether the value of $AA_n$ is greater than 90°. The first affirmative answer from this step in each cycle means that the system has proceeded through the first 90° of the new automation cycle, in the forward direction, and thus the bit CAC is reset to "0" at step 006.

When the reference press is running in the reverse direction, the interrogation at step 001 produces a negative result only when the system reaches the end of an automation cycle. The system them proceeds to step 004, which determines whether the difference between $AA_n$ and $AA_{n1}$ corresponds to an automation angle of less than 100°. As mentioned previously, the value of this difference will normally be very small, e.g., 40/10,000 of 360°, while the automation system is proceeding through a cycle. At the end of a cycle, however, the value of the difference becomes very large, e.g., 10,000−40=9960, which corresponds to an automation angle well above 100°. Thus, a "no" answer at step 004 signifies that the press has completed an automation cycle in the reverse direction.

In response to such a negative answer at step 004, the system proceeds to step 007, which sets the bit CAC to indicate that an automation cycle has been completed (running in the reverse direction). This bit CAC again remains set for the first 90° of the next automation cycle, which in the reverse mode is the 90° segment extending from 360° to 270°.

The bit CAC is reset to "0" in response to a combination of a negative answer at step 001 and positive answers at steps 002 and 008. It will be recalled that a positive answer at step 001 signifies either that the system is proceeding through an automation cycle in the reverse direction, or that the system has reached the end of an automation cycle in the forward direction. To determine which of these two conditions exists, step 002 determines whether the absolute value of the difference between $AA_n$ and $AA_{n1}$ is less than 100°.

While the system is progressing through an automation cycle in the reverse direction, the difference between $AA_n$ and $AA_{n1}$ will always be small, and thus the determination made at step 002 will be affirmative. Accordingly, the system proceeds to step 008, which determines whether $AA_n$ is less than 270°. The first affirmative answer from this interrogation in each automation cycle means that the system has passed through the first 90° of the new automation cycle in the reverse mode, and thus the bit CAC is reset to "0" at step 006.

In summary, the reference computer control unit CCU1 sets the bit CAC at a "1" level at the end of each automation cycle, the duration of which is set by the SPM control unit. This bit CAC remains set for the first 90° of the next automation cycle, and is then reset to "0". The manner in which this bit CAC is used for synchronization purposes will be apparent from the following description of FIG. 4.

The flow chart in FIG. 4 illustrates the operation of the computer control units CCU2 through CCUn. Each of these computer control units includes the same type of clock and up-down counter register described above for the reference unit CCU1. Each time one of these units CCU2 through CCUn reaches the end of an automation cycle, it checks the state of the bit CAC in the reference unit CCU1 to determine whether the automation cycles of the various units are lagging or leading the reference unit, and then modifies the timing signal from the SPM unit accordingly.

Every time the content of the counter in one of the units CCU1 through CCUn is incremented (or decremented when the press is being run in the reverse mode), step 010 in the system of FIG. 4 determines whether the new automation angle $AA_n$ is less than the previous automation angle $AA_{n1}$. If the answer is "yes", the press has either been advanced past the end of a cycle, moving in the forward direction (e.g., $AA_1$ $AA_{10,000}$) or it is being moved backwards (e.g., $AA_{499}$ $AA_{500}$). In response to an affirmative answer at step 010, the system proceeds to step 011 which determines whether the absolute value of the difference between $AA_n$ and $AA_{n1}$ corresponds to an automation angle of less than 100°, in the same manner as step 002 in FIG. 3. As explained previously, a "yes" answer at this step signifies that the system is progressing through an automation cycle in the reverse mode, and it simply returns to step 010 for the next signal $AA_n$. A "no" answer at step 011 signifies that the system has completed an automation cycle in the forward direction, and it proceeds to step 01.

A negative answer at step 010 signifies either that the system is proceeding through an automation cycle in the forward direction or that the system has reached the end of an automation cycle in the reverse direction. To determine which of these two conditions exists, step 015 determines whether the difference between $AA_n$ and $AA_{n1}$ is less than 100°, in the same manner described above for step 004 in FIG. 3. If the answer is "yes", it means that the system is proceeding through an automation cycle in the forward direction, and the system simply returns to step 010 for the next signal $AA_n$. If the answer at step 015 is "no", it means that the system has reached the end of an automation cycle in the reverse direction, and the system proceeds to the same step 012 which follows a negative answer at step 011.

If the interrogation at either step 011 or step 015 produces a negative result, it means that the system has reached the end of an automation cycle, and the system proceeds to step 012 which determines whether or not the bit CAC from the reference control unit CCU1 is in the "0" state. If the answer is "yes", it signifies that the automation cycle of control unit CCU2 is leading the automation cycle of the reference control unit CCU1 and, therefore, that the unit CCU2 should be slowed down in order to keep the automation cycles (and thus the presses) in synchronism with each other. Accordingly, an affirmative response at step 012 causes the system to proceed to step 013 which reduces by one increment the bias applied to the timing signal from the SPM control unit 10. This increases the time period for the next automation cycle of this particular CCU, thereby reducing the speed of the corresponding press.

Conversely, if the interrogation at step 012 produces a negative result, it signifies that the automation cycle of the control unit CCU2 is lagging the automation cycle of the reference control unit CCU1 and, therefore, that the unit CCU2 should be speeded up to keep the two units in synchronism. Accordingly, a negative response at step 012 causes the system, to proceed to step 014 which increases by one increment the bias applied to the timing signal from the SPM unit 10. This reduces the time period for the next automation cycle of this particular CCU, thereby increasing the speed of the corresponding press.

It will be appreciated that the above system keeps the automation cycles of the various computer control units CCU1 through CCUn closely synchronized. If the automation cycle of the reference unit CCU1 increases or decreases, due to the imprecision of the timing signals from the SPM control unit 10 or any other reason, the automation cycles of the other computer control units CCU2 through CCUn are immediately adjusted in the same direction so that they continuously follow any changes in the automation cycle of the reference unit. Consequently, the automation cycles of all the control units remain in close synchronism with each other, which means that the press being controlled by these units also remain in precise synchronism.

Although the invention has been described above in the context of a reference unit that produces synchronization signals in response to a preselected number of pulses from that unit's internal clock (the rate of such pulses being controlled by the signal from the SPM control unit 10), the reference unit could produce synchronization signals in response to pulses from the press drive rather than an internal clock. For example, a resolver could be coupled to the output shaft of the press drive motor to produce pulses that would be counted in the same manner as the clock pulses described above. The rate of such pulses would be governed by the speed of the press drive, which in turn is a function of the "strokes per minute" signal.

We claim as our invention:

1. A control system for a press line containing a plurality of presses for performing successive operations on the same workpiece, said control system comprising
a plurality of computer control units each of which controls the movement of one of said presses and the workpiece transfer mechanisms associated therewith,
means for producing a timing signal representing the desired time period for one complete cycle of each press in the line, each of said computer control units being responsive to said timing signal for controlling the associated press and transfer mechanisms to complete each press cycle within said desired time period,
means within each of said computer control units for producing a synchronizing signal at a predetermined point in said desired time period for each successive press cycle,
means responsive to (1) the synchronizing signal from one of said computer control units selected as a reference unit and (2) the synchronizing signals from each of the other computer control units, and producing sync error signals indicating whether each of said other control units is lagging or leading the reference unit, and
means responsive to each of said sync error signals for increasing or decreasing the desired time periods for the respective control units according to whether each unit is leading or lagging the reference unit.

2. A control system as set forth in claim 1 which includes means for subdividing each of said desired time periods into a multiplicity of small increments, and said means responsive to said synchronizing signals produces said sync error signal whenever the phase difference between the synchronizing signal from any of said other control units and the synchronizing signal from said reference unit is greater than one of said small increments.

3. A control system as set forth in claim 2 wherein each of said small increments represents an error of less than 0.1% of said desired time period.

4. A control system as set forth in claim 1 wherein said means responsive to said sync error signals increases or decreases said desired time period by a fixed increment in response to each sync error signal.

5. A control system as set forth in claim 1 wherein said means responsive to said sync error signals includes means within each of said other computer control units for biasing said timing signal to adjust said desired time period for that unit, and means for adjusting the bias of said timing signal in response to said sync error signals.

6. A control system as set forth in claim 1 wherein said means responsive to said synchronizing signals compares the time relationship of said signals.

7. A control system for a press line containing a plurality of presses for performing successive operations on the same workpiece, said control system comprising
a plurality of computer control units each of which controls the movement of one of said presses and the workpiece transfer mechanisms associated therewith via repetitive automation cycles which correspond to and control repetitive press cycles,
means for producing a synchronizing signal at a common predetermined point in the automation cycles of all said computer control units,
means for supplying the synchronizing signal from one of said computer control units selected as a reference unit to each of the other computer control units, and
each of said other computer control units having means responsive to the synchronizing signal from that unit and the synchronizing signal from said reference unit for increasing or decreasing the automation cycle of that unit according to whether its synchronizing signal is leading or lagging the synchronizing signal from said reference unit.

8. A control system as set forth in claim 7 wherein said automation cycles are subdivided into a multiplicity of small increments, and said synchronizing signals are produced in response to a predetermined one of said increments.

9. A control system as set forth in claim 7 wherein said means responsive to the synchronizing signals includes means for producing sync error signals indicating whether each of said other control units is lagging or leading said reference unit, and means responsive to each of said sync error signals for increasing or decreasing the desired time periods for the respective control units according to whether each unit is leading or lagging said reference unit.

10. A control system as set forth in claim 9 wherein said means responsive to said sync error signals increases or decreases said desired time period by a fixed increment in response to each sync error signal.

11. A method of controlling a press line containing a plurality of presses for performing successive operations on the same workpiece, said method comprising controlling the movement of each of said presses and the workpiece transfer mechanism associated therewith with a computer control unit, producing a timing signal representing the desired time period for one complete cycle of each press in the line, and supplying said timing signal to said computer control units to control the associated press and transfer mechanisms to complete each press cycle within said desired time period, producing a synchronizing signal within each of said computer control units at a predetermined point in said desired time period for each successive press cycle, comparing the time relationship of (1) the synchronizing signal from one of said computer control units selected as a reference unit and (2) the synchronizing signals from each of the other computer control units, and producing sync error signals indicating whether each of said other control units is lagging or leading the reference unit, and increasing or decreasing the desired time periods for the respective control units in response to each of said sync error signals and according to whether each unit is leading or lagging the reference unit.

12. A method of controlling a press line as set forth in claim 11 wherein each of said desired time periods is subdivided into a multiplicity of small increments, and producing said sync error signal whenever the phase difference between the synchronizing signal from any of said other control units and the synchronizing signal from said reference unit is greater than one of said small increments.

13. A method of controlling a press line as set forth in claim 12 wherein each of said small increments represents an error of less than 0.1% of said desired time period.

14. A method of controlling a press line as set forth in claim 11 wherein said desired time period is increased or decreased by a fixed increment in response to each sync error signal.

15. A method of controlling a press line as set forth in claim 11 wherein the timing signal supplied to each of said other computer control units is biased to adjust said desired time period for that unit, and said bias is adjusted in response to said sync error signals.

16. A method of controlling a press line containing a plurality of presses for performing successive operations on the same workpiece, said method comprising controlling the movement of each of said presses and the associated workpiece transfer mechanism with a computer control unit having repetitive automation cycles which correspond to and control repetitive press cycles, producing a synchronizing signal at a common predetermined point in the automation cycles of all said computer control units, supplying the synchronizing signal from one of said computer control units selected as a reference unit to each of the other computer control units, and increasing or decreasing the automation cycle of each of said other computer control units according to whether its synchronizing signal is leading or lagging the synchronizing signal from said reference unit.

17. A method of controlling a press line as set forth in claim 16 wherein said automation cycles are subdivided into a multiplicity of small increments, and said synchronizing signals are produced in response to a predetermined one of said increments.

18. A method of controlling a press line as set forth in claim 16 which includes the steps of producing sync error signals indicating whether each of said other control units is lagging or leading said reference unit, and increasing or decreasing the desired time periods for the respective control units in response to said sync error signals according to whether each unit is leading or lagging said reference unit.

19. A method of controlling a press line as set forth in claim 18 wherein said desired time period is increased or decreased by a fixed increment in response to each sync error signal.

* * * * *